United States Patent [19]

Oshizawa

[11] Patent Number: 4,825,369
[45] Date of Patent: Apr. 25, 1989

[54] APPARATUS FOR CONTROLLING FUEL INJECTION TIMING OF A FUEL INJECTION PUMP

[75] Inventor: Hidekazu Oshizawa, Higashimatsuyama, Japan

[73] Assignee: Diesel Kiki Co., Ltd., Tokyo, Japan

[21] Appl. No.: 870,782

[22] Filed: Jun. 5, 1986

[30] Foreign Application Priority Data

Jun. 13, 1985 [JP] Japan .................. 60-127112

[51] Int. Cl.$^4$ ............................................. F02M 39/00
[52] U.S. Cl. .................. 364/431.05; 123/478; 123/357
[58] Field of Search ............ 364/431.05, 431.03; 123/357, 478, 479, 501, 502, 494, 507, 508, 179 L; 73/117.3

[56] References Cited

U.S. PATENT DOCUMENTS

| | | | |
|---|---|---|---|
| 4,143,632 | 3/1979 | Kobayashi | 123/502 |
| 4,378,695 | 4/1983 | Oshizawa | 73/117.3 |
| 4,413,508 | 11/1983 | Kawamura et al. | 123/478 |
| 4,467,765 | 8/1984 | Suzuki et al. | 123/419 |
| 4,503,830 | 3/1985 | Nakamura et al. | 123/501 |
| 4,541,380 | 9/1985 | Oshizawa et al. | 123/357 |
| 4,638,782 | 1/1987 | Yasuhara et al. | 123/357 |

Primary Examiner—Parshotam S. Lall
Assistant Examiner—V. N. Trans
Attorney, Agent, or Firm—James Creighton Wray

[57] ABSTRACT

In a fuel injection timing control apparatus for controlling the injection advance angle of fuel injected from a fuel injection pump having a solenoid valve which is opened/closed by a driving pulse for controlling the fuel injection, the apparatus has a detector for detecting a delay time of fuel injection due to the delay time of the solenoid valve, and the delay time of fuel injection is converted into the angle of a driving shaft of the pump corresponding to the delay time. A target advance angle according to the operating condition of an associated internal combustion engine is calculated and the output timing of the driving pulse is set by taking account of the angle corresponding to the delay time of fuel injection, whereby the target advance angle can be obtained in response to the driving pulse.

10 Claims, 3 Drawing Sheets

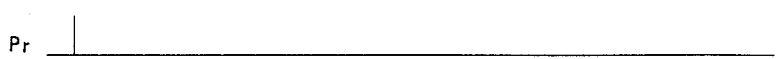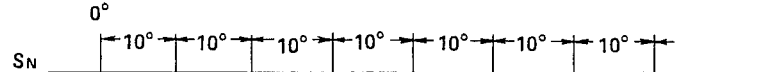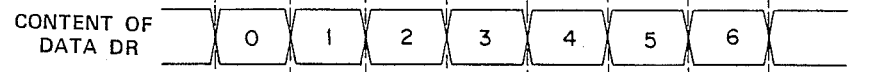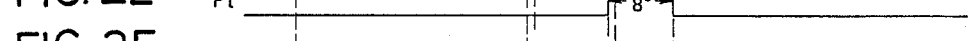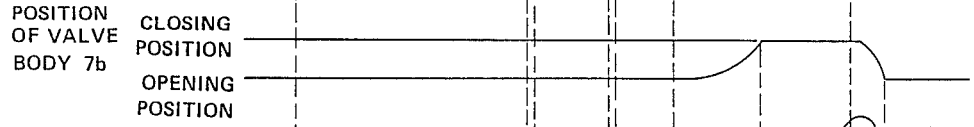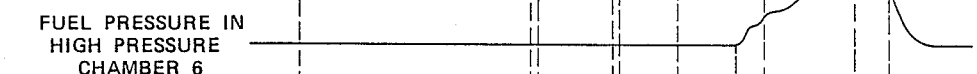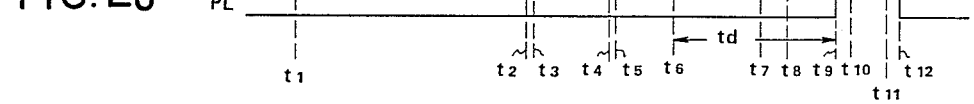

APPARATUS FOR CONTROLLING FUEL INJECTION TIMING OF A FUEL INJECTION PUMP

BACKGROUND OF THE INVENTION

The present invention relates to an apparatus for controlling the fuel injection timing of a fuel injection pump, and more particularly to a fuel injection timing control apparatus for controlling the fuel injection timing of a fuel injection pump, which is constructed so as to perform the adjustment of fuel injection by controlling the opening/closing of a solenoid valve located between a high pressure chamber and a lower pressure portion of the fuel injection pump.

In the prior art, there is known a fuel injection apparatus which has a solenoid valve located between a high pressure chamber and a lower pressure portion of a fuel injection pump, in which the high pressure chamber is made to communicate with the lower pressure portion or alternatively to disconnect from the lower pressure portion by means of the opening/closing operation of this solenoid valve, thereby regulating both the amount of fuel injection and the fuel injection timing. In this type of fuel injection pump, the control of the fuel injection timing (advance angle of injection) needs to be performed with the delay in the response of the solenoid valve taken into consideration. Because of this, Japanese Patent Public Disclosure No. 231150/84 discloses a device in which a target ignition timing according to the operating condition of an engine is calculated and the actual injection timing of one particular cylinder under consideration out of a plurality of cylinders of the engine is detected in order to measure the difference in time between the target ignition time and the actual ignition time, whereby the ignition timing of each cylinder is controlled so as to reduce the difference to zero.

However, in this conventional device, the sensor for detecting the actual ignition timing is mounted only on one of a plurality of cylinders of the engine, and the control of the ignition timing of the other cylinders is performed in accordance with the difference in timing between the target ignition timing and the actual ignition timing of this particular cylinder under consideration. Consequently, in such a case as when the speed of the engine has suddenly changed, it has the problem of not being able to control the fuel injection timing accurately.

SUMMARY OF THE INVENTION

It is therefore an object of the present invention to provide an improved fuel injection timing control apparatus for a fuel injection pump.

It is another object of the present invention to provide a fuel injection timing control apparatus which is able to control accurately the fuel injection timing of the individual cylinders in accordance with the required target value even if there is only one sensor for detecting the actual values of the timings which influence the start of the combustion of fuel, for example, the actual ignition timing, the actual timing of the beginning of fuel injection or the like.

According to the present invention, in a fuel injection timing control apparatus for controlling the injection advance angle of fuel injected from a fuel injection pump to an associated internal combustion engine, the fuel injection pump including a solenoid valve which is located between a high pressure chamber and a lower pressure portion of the fuel injection pump so that the high pressure chamber can be communicated with the lower pressure portion and is opened/closed in response to a driving pulse generated from a driving pulse generator, the apparatus comprises a first means for outputting a first data relating to an angular position of a driving shaft of the fuel injection pump which represents a target advance angle of fuel injection determined according to the operating condition of the internal combustion engine, a detecting means for detecting the actual values of a timing which influences the beginning of the combustion of fuel in the internal combustion engine, a second means responsive to the output from the detecting means and the driving pulse for producing a second data representing the delay time of fuel injection with respect to the driving pulse, a speed detecting means for generating speed data relating to the speed of the internal combustion engine at each instant, a third means responsive to the second data and the speed data for producing a third data representing the angle of the driving shaft corresponding to the delay time shown by the second data, and a setting means responsive to the first and third data for setting the output timing of the driving pulse so that the target advance angle represented by the first data can be obtained.

In response to the driving pulse, the solenoid valve is operated in such a way that the high pressure chamber is disconnected from the lower portion only during the period set by the width of the driving pulse. Due to this, the supplying of fuel by the fuel injection pump becomes possible only during this period. The data showing the required target advance angle of injection is obtained as the first data representing the angle of the driving shaft of the fuel injection pump where the target advance angle of fuel injection is obtained. On the other hand, in the second means, the period from the time at which the driving pulse is generated to the time at which fuel combustion begins to be influenced (for example, the time at which the needle valve of the injection valve is lifted) is measured as the delay time, and a second data showing the result of this measurement is obtained. Accordingly, this data is related to the delay time of fuel injection and includes the operation response delay time of the solenoid valve with respect to the driving pulse. The second data is converted by the use of the speed data into the third data which represents the advance angle of the driving shaft corresponding to the delay time at that time.

In the setting means, the angle of the driving shaft shown by the first data is corrected by the angle of the driving shaft shown by the third data; in other words, the angle of the driving shaft shown by the first data is corrected based on the delay time. Then, the output timing of the driving pulse is determined so that the desired target injection advance angle is obtained.

As can be understood from the foregoing, since the amount of the target advance angle of injection is represented as an angle of the driving shaft, and the injection delay time, which includes the operation delay time of the solenoid valve, is also represented as an angle of the driving shaft, the setting of the advance angle of injection is performed entirely with reference to the angle of the driving shaft. As a result, even in the case where the speed of the engine has suddenly changed, the production of control error due to the change will not create much problem, and the control of the advance angle of injection for the individual cylinders can be performed in an optimum manner.

The invention will be better understood and other objects and advantages thereof will be more apparent from the following detailed description of preferred embodiments with reference to the accompanying drawings.

BRIEF DESCRIPTION OF THE DRAWINGS

FIGS. 2A to 2J are time charts for describing the operation of the apparatus shown in FIG. 1.

DESCRIPTION OF THE PREFERRED EMBODIMENTS

Figure 1A:
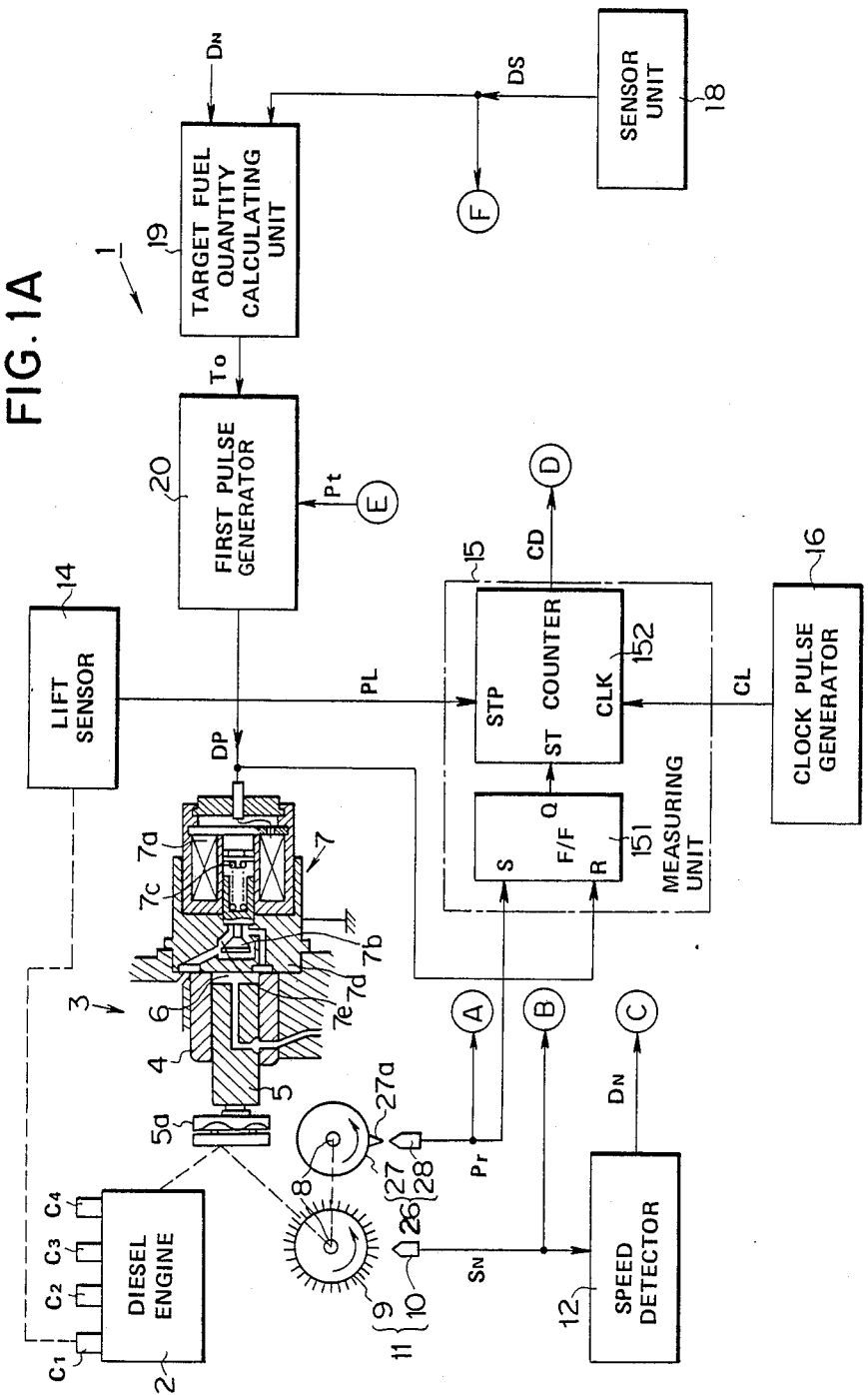
FIGS. 1A and 1B constitute a block diagram showing an embodiment of a fuel injection apparatus according to the present invention.
Figure 1B:
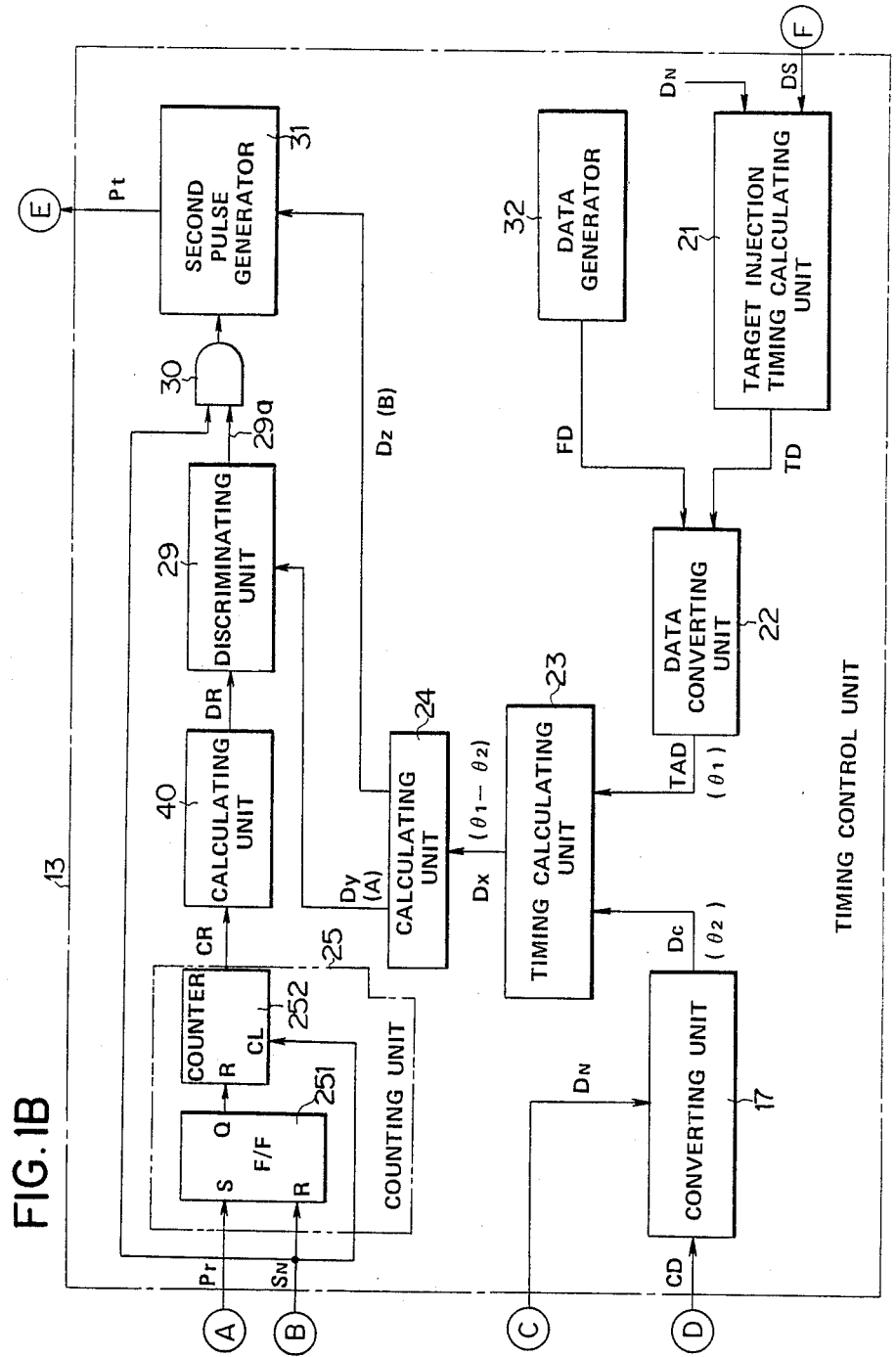

FIG. 1 shows a block diagram of an embodiment of a fuel injection apparatus having a fuel injection timing control apparatus according to the present invention. The fuel injection apparatus 1 comprises a fuel injection pump 3 which is driven by a diesel engine 2 and injects a supply of fuel to the diesel engine 2. In the embodiment shown in FIG. 1, this fuel injection pump 3 is a distribution-type fuel injection pump, and a plunger 5 which is inserted in a plunger barrel 4 rotates with reciprocal movement according to the cam profile of a cam disc 5a driven by the rotational input power from the diesel engine 2. As a result, the fuel pressurized within a high pressure chamber 6 is supplied under pressure to the individual cylinders $C_1$ to $C_4$ of the diesel engine 2 in sequence through injection pipes (not shown). In order to control the fuel quantity, this fuel injection pump 3 is provided with a normally-opened type solenoid valve 7 having an exciting coil 7a, whereby the high pressure chamber 6 can be communicated with the lower pressure portion within the fuel injection pump 3. When a driving pulse DP, which is output in the manner to be described later, is applied to the exciting coil 7a so that the exciting coil 7a is excited, a valve body 7b moves in the righthand direction in FIG. 1 against the force of a return spring 7c, and is seated on a valve seat 7e formed in a valve casing 7d, whereby the solenoid valve 7 is put into a closed state.

When the solenoid valve 7 is in an open state, the high pressure chamber 6 is made to communicate with the lower pressure portion and consequently, fuel will not be injected therefrom even if the plunger 5 performs lifting operations.

On the other hand, when the solenoid valve 7 is closed by the energization of the exciting coil 7a, the high pressure chamber 6 is disconnected from the lower pressure portion, the fuel is pressurized in the high pressure chamber 6 in accordance with the lifting operation of plunger 5, and a state in which fuel can be supplied is created. When solenoid valve 7 is opened during the supplying of fuel, the pressurized fuel within the high pressure chamber 6 is released, and the fuel supplying operation under pressure is terminated.

A fuel injection pump which is constructed to control the timing of the start and termination of pressurized fuel supply by the use of a solenoid valve as stated above, is widely known per se, so that in FIG. 1, only the main portions of the structure are shown, and the structural details are shown in simplified form.

In order to detect the rotational state of a driving shaft 8 of the fuel injection pump 3, the driving shaft 8 is equipped with a rotational sensor 11 which consists of a pulser 9 and an associated electromagnetic pick-up coil 10. In the embodiment shown in FIG. 1, the diesel engine 2 is a 4-cycle, 4-cylinder engine and 36 cogs are provided on the periphery of the pulser 9 at 10 degree intervals. Consequently, every time the driving shaft 8 rotates 10 degrees, an electric signal is output from the electromagnetic pick-up coil 10. This electric signal is input to a speed detector 12 as a rotation pulse signal $S_N$ wherein the time interval of the signal output from the electromagnetic pick-up coil 10 is measured on the basis of the rotation pulse signal $S_N$, and speed data $D_N$ which represents the speed of the diesel engine 2 at each instant is output on the basis of the result of the measurement. The content of the speed data $D_N$ is renewed every time a signal is output from the electromagnetic pick-up coil 10; in other words, every time the driving shaft rotates 10 degrees, and the renewed data is supplied to a timing control unit 13.

The pulser 9 is secured to the driving shaft 8 in such a way that one predetermined cog out of 36 cogs provided on the outside of pulser 9 is facing the electromagnetic pick-up coil 10 at a time before when the driving pulse DP for the injection of fuel into cylinder $C_1$ is output just before the piston (not shown) provided in the cylinder $C_1$ of the diesel engine 2 has reached its top dead center for compression, but after when the driving pulse DP one prior to it has fallen in level. In order to be able to know beforehand the time when the predetermined cog comes to face opposite the electromagnetic pick-up coil 10, there is provided a pulse generator 26 having a pulser 27 with a single cog 27a and an electromagnetic pick-up coil 28 associated with the pulser 27. The pulser 27 is secured on the driving shaft 8 in such a way that the cog 27a comes to face opposite the electromagnetic pick-up coil 28 at a time which is later than the time when the cog one prior to the predetermined cog of the pulser 9 comes to face opposite the electromagnetic pick-up coil 10 but is earlier than the time when the predetermined cog comes to face opposite the electromagnetic pick-up coil 10. Consequently, the signal output from the rotation sensor 11 just after the reference pulse $P_r$ is generated as TDC pulse from the pulse generator 26 when the cog 27a comes to face opposite the electromagnetic pick-up coil 28, represents the timing of the top dead center in the cylinder $C_1$. As a result, the generation of this TDC pulse included in the rotation pulse signal $S_N$ output from the rotation sensor 11 can, by using the reference pulse $P_r$, be discriminated from the other pulses produced by the pulse generator 11.

The numeral 14 denotes a lift sensor for detecting the lift timing of a needle valve of a fuel injection valve (not shown) mounted on the cylinder $C_1$ of the diesel engine 2, and a lift pulse PL is produced by the lift sensor 14 every time the needle valve is lifted and the fuel injection valve opened by the pressure of the fuel supplied from the fuel injection pump.

In order to measure the injection delay time, namely the period from the time when the driving pulse DP is output to the time when the fuel injection into the cylinder corresponding to the driving pulse is started, the lift pulse PL and the driving pulse DP are applied to a measuring unit 15 to which the reference pulse $P_r$ is also input. The measuring unit 15 has a flip-flop 151, and the reference pulse $P_r$ and the driving pulse DP are input to the set terminal S and the reset terminal R thereof, respectively. The flip-flop 151 is adapted to be set by the reference pulse $P_r$ and to be reset when the level of the driving pulse DP changes from "L" to "H". The output terminal Q of the flip-flop 151 is connected to the start terminal ST of a binary counter 152 having a stop terminal STP to which the lift pulse PL is applied, and clock pulses CL generated by a clock pulse generator 16 are applied to a clock terminal CLK of the counter 152. The counter 152 is reset and starts to count the clock pulses CL when the level of the output terminal Q changes from "H" to "L", and the counting operation of the counter 152 stops when the lift pulse PL is applied to its stop terminal STP. The counting result of the counter 152 is output as counting data CD.

Thus, the counter 152 is reset by the flip-flop 151 in response to the rise in the level of the driving pulse DP for the fuel injection to the cylinder $C_1$, and at the same time, the counter 151 starts to count the number of clock pulses CL generated by the clock pulse generator 16. The counting operation of the counter 152 is terminated in response to the application of the lift pulse PL, whereby the number of clock pulses generated during the period from the time when the level of the driving pulse DP concerned changes from "L" to "H" to the time when the lift pulse PL is output is counted. As a result, the counting data CD output from the measuring unit 15 shows the injection delay time.

The block denoted by the numeral 18 is a sensor unit which detects a predetermined operating condition of the diesel engine 2 other than the rotational speed of diesel engine 2 and outputs operating condition data DS showing the result of the detection. The operating condition data DS from the sensor unit 18 is applied to a target fuel quantity calculating unit 19 to which the speed data DN is also applied.

The target fuel quantity calculating unit 19 calculates the optimum fuel quantity for the operating condition of the diesel engine 2 at each instant on the basis of predetermined governor characteristic data in response to the operating condition data DS and the speed data DN. The target fuel quantity calculating unit 19 outputs valve closing time data $T_o$ representing the closed period of the solenoid valve 7 required for obtaining the optimum fuel quantity from the fuel injection pump 3.

The valve closing time data $T_o$ is input to a first pulse generator 20 as data for determining the pulse width of the driving pulse DP, and when a timing pulse $P_t$, which is produced as will be described later, is applied to the first pulse generator 20 as a trigger pulse, a driving pulse DP with a pulse width determined by the valve closing time data $T_o$ at that time is generated from the first pulse generator 20 and applied to the exciting coil 7a of the solenoid valve 7.

In the following, description will be given of a timing control unit 13 for determining the timing of the output of the driving pulse DP from the first pulse generator 20.

The timing control unit 13 has a converting unit 17 which receives the counting data CD and the speed data DN and on the basis of these data converts the injection delay time represented by the counting data CD into the corresponding amount of rotation angle of the driving shaft 8. More specifically, the converting unit 17 converts the time represented by the counting data CD into the amount of rotation angle of the driving shaft 8 based on the engine speed at each instant shown by the speed data DN, and the angle $\theta_2$ resulting from this conversion is output as correction data $D_c$. As can be understood from the above description, the delay time includes not only the operation delay, i.e. the time from the application of the driving pulse DP to solenoid valve 7 to the actual closing of the solenoid valve 7, but also the fuel transmission delay time, i.e. the period up to when the pressurized fuel is actually supplied in the cylinder.

The timing control unit 13 also has a target injection timing calculating unit 21 which, in response to the operating condition data DS and the speed data DN, calculates an optimum injection timing for the operating condition of the diesel engine 2 at each instant and outputs target timing data TD representing the calculated optimum injection timing to a data converting unit 22. The data converting unit 22 also receives data FD produced by a data generator 32 and representing the time period between the instant when the piston of cylinder $C_1$ of diesel engine 2 reaches top dead center and the instant of output of the rotation pulse signal $S_N$ output just after the reference pulse $P_r$. The data FD is expressed as the difference in the angular position of the driving shaft 8 between said two instants.

That is, the data FD shows the angular difference between a reference angular position of the driving shaft 8 of the fuel injection pump 3 and that of the crankshaft of the diesel engine 2 when they are connected. The data FD can be set at the required value in the data generator 32 on the basis of the actual angular difference which depends on the state of connection between the driving shaft 8 of the fuel injection pump 3 and the crankshaft of the diesel engine 2.

Based on these data FD and TD, the data converting unit 22 outputs target angle data TAD representing the angle $\theta_1$ of the driving shaft 8 corresponding to the target injection advance angle value.

The target angle data TAD represents the angular position of the driving shaft 8 at which the injection of fuel should actually start, while the correction data $D_c$ represents the length of the period between the instant the driving pulse DP is output and the instant the injection of fuel is actually started, as the angle of driving shaft 8. In order to obtain data showing the time at which the driving pulse DP should be output on the basis of the data TAD and $D_c$, there is provided a timing calculating unit 23. The timing calculating unit 23 calculates the difference between the driving shaft angle $\theta_1$ represented by target angle data TAD and the driving shaft angle $\theta_2$ represented by correction data $D_c$. Data $D_x$ representing the difference $\theta_1-\theta_2$ is output from the timing calculating unit 23 and input to a calculating unit 24.

In the calculating unit 24, an angle of 10 degrees, which is the angular interval between the cogs on the outer surface of pulser 9, is subtracted from the angle $\theta_1-\theta_2$ represented by the data $D_x$. The ten-place digit of this difference is defined as A and represented by data $D_y$, while the one-place digit thereof is defined as B and represented by data $D_z$. The data $D_y$ and the data $D_z$ are output from the calculating unit 24.

A counting unit 25 receives the reference pulse $P_r$ from the pulse generator 26 and the rotation pulse signal $S_N$ from the rotational sensor 11. The counting unit 25 has a flip-flop 251, and the reference pulse $P_r$ and the rotation pulse signal $S_N$ are input to the set terminal S and the reset terminal R thereof, respectively. The flip-flop 251 is adapted to be set by the application of the reference pulse $P_r$ and to be reset by the application of the pulse of the rotation pulse signal $S_N$. The output terminal Q of the flip-flop 251 is connected to the reset terminal R of a binary counter 252 having a clock terminal CL to which the rotation pulse signal $S_N$ is applied as clock pulses. The counter 252 is reset and starts to count the pulses of the rotation pulse signal $S_N$ when the level of the output terminal Q of the flip-flop 251 changes from "H" to "L". The counting result of the counter 252 is output as data CR.

Thus, the counter 252 is reset by the rotation pulse signal $S_N$ which is output just after the reference pulse $P_r$ is output, after which the content of the counting is incremented by one every time the rotation pulse signal $S_N$ is output.

The data CR which represent the result of this counting is input to a calculating unit 40 wherein the contents of data CR is divided by 9, and the remainder of this division is output as data DR. This operation is carried out because the diesel engine 2 is a 4-cycle, 4-cylinder engine wherein the piston assumes the top dead center position for compression 4 times during one rotation of the pulser 9. The data DR from the calculating unit 40 is input to a discriminating unit 29 wherein a discrimination is made as to whether or not the content of the data $D_y$ agrees with the content of the data DR. The level of the output line 29a of the discriminating unit 29 becomes "H" only in the case where the content of the data DR coincides with that of the data $D_y$.

One input terminal of an AND gate 30 is connected to the output line 29a, and the other input terminal thereof is connected to the electromagnetic pick-up coil 10. Consequently, when the rotation pulse signal $S_N$ is output during the high level state of the output line 29a, the rotation pulse signal $S_N$ is derived through the AND gate 30 and input as a trigger signal to a second pulse generator 31.

The second pulse generator 31 is triggered by the output from the AND gate 30 to output the timing pulse $P_t$. The data $D_z$ is input to the pulse generator 31 as information for determining the pulse width of the timing pulse $P_t$. Consequently, the second pulse generator 31 is triggered by a rotation pulse signal $S_N$ which is output just after the contents of the data DR coincides with the contents of the data $D_y$, that is, A, and a timing pulse $P_t$ whose pulse width is determined by the data $D_z$ is output. The data $D_z$ represents a rotational angle B (less than 10 degrees) of the driving shaft 8, and the pulse width of the timing pulse $P_t$ determined by the data $D_z$ is set so that it corresponds to the rotational angle B. As a result, assuming that the rotational position of the driving shaft 8 is zero degree at the output of the rotation pulse signal $S_N$ which is output just after the output of the reference pulse $P_r$, the timing of the trailing edge of the timing pulse $P_t$ will be the angular timing of $\theta_1 - \theta_2$.

The first pulse generator 20 is triggered by the timing of the trailing edge of the timing pulse $P_t$, and the driving pulse DP having a pulse width set by the valve closing time data $T_o$ is output from the first pulse generator 20.

In the following, the operation of the fuel injection apparatus 1 shown in FIG. 1 will be described with reference to the waveforms shown in FIGS. 2A to 2J. FIG. 2A shows the waveform of the reference pulse $P_r$ and FIG. 2B shows the waveform of the rotation pulse signal $S_N$. The reference pulse $P_r$ is a pulse train signal consisting of pulses output one every time the driving shaft 8 rotates 360 degrees, while the rotation pulse signal $S_N$ is a pulse train signal which consist of pulses output one every time the driving shaft 8 rotates 10 degrees. As previously stated, in the present apparatus 1, the data converting unit 22 produces the target angle data TAD by which the target injection timing is represented as the angular position of the driving shaft 8, and the converting unit 17 produces the correction data $D_c$ by which the magnitude of the fuel injection delay is represented as the angular position of the driving shaft 8. Both data TAD and $D_c$ are input into the timing calculating unit 23 and the calculation of the difference between the angular position $\theta_1$ represented by the target angle data TAD and the amount $\theta_2$ of rotation represented by the correction data $D_c$ is carried out. In order to present the rest of the description concretely, $\theta_1$ will be assumed to be 70 degrees, and $\theta_2$ will be assumed to be 22 degrees. Accordingly, the content of the data $D_x$ output from the timing calculating unit 23 becomes 48 degrees. The calculating unit 24 outputs the data $D_y$ which has as its content the number 3 which is the ten-place digit of the calculation $48° - 10° (= 38°)$, and the data $D_z$ which has as its content the number 8 which is the one-place digit of the angle 38°.

The counter 252 is reset at the time $t = t_1$ when the output timing of the rotation pulse signal $S_N$ which is output just after the output of the reference pulse $P_r$ is output, after which the counting value is incremented by one every time an individual pulse of the rotation pulse signal $S_N$ is output. The contents of data DR are shown in FIG. 2C. Thus, every time the fourth pulse after the generation of the reference pulse is input into the counting unit 25 at $t = t_2$, the content of data CR becomes 3, so that the content of data DR also becomes 3, and in response to this, the level of the output line 29a of the discriminating unit 29 changes from "L" to "H". The actual timing of the level change of the output line 29a from "L" to "H" is at $t = t_3$, which is a short time later than $t_2$ due to the response delay in the circuit (FIG. 2D). When the fifth pulse after the generation of the reference pulse is output at $t = t_4$, the content of data DR becomes 4, so that the level of the output line 29a of the discriminating unit 29 changes from "H" to "L". Also in this case, due to the delay in response in the circuit, the time at which the level of the output line 29a changes from "H" to "L" is $t = t_5$ which is a short time after $t_4$ (FIG. 2D).

Therefore, the AND gate 30 is open when the fifth pulse is output at $t_4$ (FIG. 2B and 2D), and the second pulse generator 31 is triggered by the fifth pulse output at $t_4$. The data $D_z$ which has 8 as its content, is applied to the second pulse generator 31, from which the timing pulse $P_t$ with a pulse width corresponding to 8 degrees of rotation of the driving shaft 8 is generated when triggered (FIG. 2E). That is to say, the trailing edge of the timing pulse signal $P_t$ represents a timing at which the driving shaft 8 has rotated 48 degrees from the instant of output of the rotation pulse signal $S_N$ produced just after the generation of the reference pulse $P_r$.

The timing pulse signal $P_t$ is input to the first pulse generator 20, and a driving pulse DP having a pulse width determined by the valve closing time data $T_o$ in response to the change in level from "H" to "L" is output at $t = t_6$ (FIG. 2F).

When the driving pulse DP shown in FIG. 2F is applied to the exciting coil 7a of the solenoid valve 7, the valve body 7b starts to move a short time after $t = t_6$ as shown in FIG. 2G due to the delay in its response, and the valve body 7b reaches its completely closed position at $t = t_7$. When the level of the driving pulse DP changes from "H" to "L" at $t = t_{10}$, the valve body 7b starts to move a short time later due to this change, and the valve body 7b is at a completely open position at $t_{11}$.

Accordingly, the fuel pressure arising in the high pressure chamber 6 at this time changes as shown in FIG. 2H. This fuel pressure is transmitted through the injection pipe to the injection valve with the required delay time $t_y$ ($t=t_8$), and the injection of fuel is performed at $t=t_9$. FIG. 2J shows the waveform of a lift pulse PL which is output from the lift sensor 14 in response to the lifting of the needle valve due to the fuel pressure shown in FIG. 21. It can be understood from the waveform of the lift pulse PL that the needle valve is lifted at $t_9$ and the needle valve is seated on the corresponding valve seat at $t_{12}$.

It can also be understood from the FIGS. 2E through to 2J that the period $t_d$ between $t_6$ and $t_9$ is the injection delay time in this case. The injection delay time $t_d$ is measured in the measuring unit 15 every time the driving shaft has rotated once, and the correction data $D_c$ obtained on the basis of the results of this measurement is employed as data for controlling the next injection timing.

According to the above-mentioned construction, data TAD which represents the target injection timing and data $D_c$ which represents the injection delay are provided as converted into data representing the angle of the driving shaft 8, and the control of injection timing is performed based on the rotation pulse signal $S_N$ which indicates the position of angular rotation of the driving shaft 8. Consequently, even if the speed of the diesel engine 2 suddenly changes, the accuracy in the control of injection timing will not be directly influenced. As a result, even in the case where control is performed with an internal combustion engine with numerous cylinders, it is sufficient for the sensor for detecting the actual injection timing etc. to mount on one particular cylinder. Therefore, a highly accurate control of injection timing can be performed with stability using a simple construction.

I claim:

1. A fuel injection timing control apparatus for controlling the injection advance angle of fuel injected from a fuel injection pump to an associated internal combustion engine, said fuel injection pump including a solenoid valve which is located between a high pressure chamber and a lower pressure portion of said fuel injection pump and is opened/closed in response to a driving pulse signal so that an injection advance and an injection quantity of fuel from said fuel injection pump can be controlled, said apparatus comprising:
    a first means for outputting a first data relating to an angular position of a driving shaft of said fuel injection pump which represents a target advance angle of fuel injection determined according to the operating condition of said internal combustion engine;
    a detecting means for detecting the actual values of a timing which influences the beginning of the combustion of fuel in said internal combustion engine;
    a second means responsive to the output from said detecting means and the driving pulse signal for producing a second data representing a delay time from a time of an application of the driving pulse signal to said actual value of the timing obtained in correspondence thereto; a rotation generator for generating rotation pulses every predetermined angle of rotation of the driving shaft;
    a speed detector responsive to the rotation pulse signal for producing speed data relating to the speed of said internal combustion engine;
    a third means responsive to the second data and the speed data for producing a third data representing the angle of the driving shaft corresponding to the delay time shown by the second data; and
    a correcting means for correcting the angle represented by the first data by the angle represented by the third data;
    an outputting means responsive to the rotation pulses for producing an angular position data relating to an angular position of the driving shaft at each instant;
    a determining means responsive to said output means and said correcting means for determining an angular position of said driving shaft at where said solenoid valve is to be closed; and
    means responsive to said determining means for generating the driving pulse signal so that the target advance angle of fuel injection determined by said first means can be attained.

2. An apparatus as claimed in Claim 1 wherein said first means has a first calculating means responsive to at least said speed data for calculating the target advance angle of fuel injection, a data output means for outputting data concerning the angle of attachment of the driving shaft of said fuel injection pump to a crankshaft of said internal combustion engine, and means responsive to the outputs from said first calculating means and said data output means for producing data representing an angular position of the driving shaft corresponding to the calculated target advance angle of fuel injection as said first data.

3. An apparatus as claimed in Claim 1 wherein said detecting means is a lift sensor for detecting the lift timing of a needle valve of a fuel injection valve mounted on a cylinder of said internal combustion engine.

4. An apparatus as claimed in Claim 1 wherein said speed detecting means has a rotation sensor consisting of a first pulser secured on the driving shaft and an associated first electromagnetic pick-up coil and generating a rotation pulse signal, and a speed detector responsive to the rotation pulse signal for producing speed data relating to the speed of said internal combustion engine at each instant.

5. An apparatus as claimed in Claim 4 wherein said first pulser has a plurality of cogs provided on its outer periphery at equi-angular intervals, and a pulse train signal formed by pulses generated from said first electromagnetic pick-up coil every time the driving shaft rotates a prescribed angle are derived as the rotation pulse signal.

6. An apparatus as claimed in Claim 4 wherein said setting means has a calculating means for calculating the difference between the angle represented by the first data and the angle represented by the third data, an outputting means responsive to the rotation pulse signal for producing an actual timing data relating to an actual timing of rotation of the driving shaft, and a pulse generating means for generating a pulse signal representing an output timing of the driving pulse in response to the actual timing data, the data representing the difference and the rotation pulse signal.

7. An apparatus as claimed in Claim 6 wherein said outputting means has a reference pulse generating means for generating a reference pulse indicating the time the driving shaft reaches a prescribed reference rotational position, and means responsive to the reference pulse and the rotation pulse signal for obtaining the actual timing data on the basis of the number of rotation pulse signal pulses generated just after the reference pulse is generated.

8. An apparatus as claimed in Claim 6 wherein said pulse generating means has means responsive to the data representing the difference for producing a first calculated data and a second calculated data, the first calculated data indicating the quotient obtained by dividing the angle showing the difference by the interval angle of the cogs of the first pulser and the second calculated data indicating the remainder of this division, a discriminating means for discriminating whether or not the content of the first calculated data is coincident with that of the actual timing data, a taking-out means for taking out the rotation pulse signal which is produced just after it is detected by said discriminating means that the content of the first calculating data is coincident with that of the actual timing data, and means for generating a timing pulse with a pulse width corresponding to the second calculated data in response to the output of said taking-out means, whereby the output timing of the driving pulse is determined by the timing pulse.

9. An apparatus as claimed in Claim 7 wherein said reference pulse generating means has a second pulser secured on the driving shaft and an associated second electromagnetic pick-up coil and said second pulser has a single cog provided on its outer periphery whereby the reference pulse is produced at the timing when the single cog comes to face opposite said second electromagnetic pick-up coil.

10. A fuel injection timing control apparatus for controlling the injection advance angle of fuel injected from a fuel injection pump to an associated internal combustion engine, said fuel injection pump including a solenoid valve which is located between a high pressure chamber and a lower pressure portion of said fuel injection pump and is opened/closed in response to a driving pulse signal, so that an injection advance and an injection quantity of fuel from said fuel injection pump can be controlled, said apparatus comprising:
  a first means for outputting a first data relating to an angular position of a driving shaft of said fuel injection pump which represents a target advance angle of fuel injection determined according to the operating condition of said internal combustion engine;
  a detecting means for detecting the actual values of a timing which influences the beginning of the combustion of fuel in said internal combustion engine;
  a second means responsive to the output from said detecting means and the driving pulse signal for producing a second data representing a delay time from a time of an application of the driving pulse signal to said actual value of the timing obtained in correspondence thereto;
  a rotation generator for generating rotation pulses every predetermined angle of rotation of the driving shaft;
  a speed detector responsive to the rotation pulse signal for producing speed data relating to the speed of said internal combustion engine;
  a third means responsive to the second data and the speed data for producing a third data representing the angle of the driving shaft corresponding to the delay time shown by the second data;
  a correcting means for correcting the angle represented by the first data by the angle represented by the third data;
  a reference pulse generating means for generating a reference pulse indicating the time the driving shaft reaches a prescribed reference rotational position;
  means responsive to the reference pulse and the rotation pulse for obtaining the actual timing data indicating an angular position of the driving shaft at each instant by counting the rotation pulses generated just after the reference pulse is generated;
  a determining means responsive to said output means and said correcting means for determining an angular position of said driving shaft at where said solenoid valve is to be closed;
  means responsive to an output from said determining means for producing a first calculated data and a second calculated data, the first calculated data indicating the quotient obtained by dividing the angle shown by the output from said determining means by the interval angle of the cogs of the first pulser and the second calculated data indicating the remainder of this division;
  a discriminating means for discriminating whether or not the content of the first calculated data is coincident with that of the actual timing data;
  a taking-out means for taking out the rotation pulse signal which is produced just after it is detected by said discriminating means that the content of the first calculating data is coincident with that of the actual timing data;
  means for generating a timing pulse with a pulse width corresponding to the second calculated data in response to the output of said taking-out means;
  means responsive to said timing pulse for generating the driving pulse signal with a pulse width necessary for supplying a desired fuel quantity so that the target advance angle of fuel injection determined by said first means can be attained.

* * * * *